(12) United States Patent
Kissell et al.

(10) Patent No.: US 6,923,883 B2
(45) Date of Patent: Aug. 2, 2005

(54) FRANGIBLE FIBERGLASS INSULATION BATTS

(75) Inventors: Carl J. Kissell, Shelbyville, IN (US); Cameron J. Wright, Naperville, IL (US); Ronald A. Houpt, Shelbyville, IN (US); Jon W. Pereira, Shelbyville, IN (US)

(73) Assignee: Knauf Fiber Glass GmbH, Shelbyville, IN (US)

( * ) Notice: Subject to any disclaimer, the term of this patent is extended or adjusted under 35 U.S.C. 154(b) by 0 days.

(21) Appl. No.: 10/670,539

(22) Filed: Sep. 25, 2003

(65) Prior Publication Data

US 2005/0067091 A1 Mar. 31, 2005

(51) Int. Cl.[7] .............................. B32B 31/00; E04B 1/62
(52) U.S. Cl. ...................... 156/259; 156/264; 156/268; 156/257; 156/270; 156/271; 156/512; 156/513; 156/546; 156/304.6; 156/307.1; 156/307.3; 52/98
(58) Field of Search ................................ 156/270, 513, 156/307.1, 307.3, 271, 259, 268, 264, 257, 512, 529, 517, 546, 304.6; 52/98, 309.3, 309.4, 309.5, 309.6, 309.15, 309.16, 404.1, 404.4; 428/43, 54, 55, 57, 58, 68, 74, 426; 442/180

(56) References Cited

U.S. PATENT DOCUMENTS

| | | | |
|---|---|---|---|
| 1,238,356 A | 8/1917 | Stokes | |
| 3,070,475 A | * 12/1962 | Carlson, Jr. et al. | ........ 428/119 |
| 3,230,995 A | * 1/1966 | Shannon | ........ 156/166 |
| 3,493,452 A | * 2/1970 | Cole | ........ 156/254 |
| 3,546,846 A | * 12/1970 | Sens | ........ 53/433 |
| 3,955,031 A | * 5/1976 | Jones et al. | ........ 442/412 |
| 4,342,610 A | 8/1982 | Ray, Jr. | |
| 4,362,585 A | * 12/1982 | de Antonis et al. | ........ 156/62.2 |
| 4,552,793 A | * 11/1985 | Cameron et al. | ........ 428/53 |
| 4,700,521 A | 10/1987 | Cover | |
| 4,772,499 A | 9/1988 | Greenway | |
| 5,240,527 A | * 8/1993 | Lostak et al. | ........ 156/62.4 |
| 5,350,663 A | 9/1994 | Blum et al. | |
| 5,765,318 A | 6/1998 | Michelsen | |
| 5,900,298 A | * 5/1999 | Syme et al. | ........ 428/68 |
| 5,981,037 A | 11/1999 | Patel et al. | |
| 6,083,594 A | 7/2000 | Weinstein et al. | |
| 6,165,305 A | 12/2000 | Weinstein et al. | |
| 6,191,057 B1 | * 2/2001 | Patel et al. | ........ 442/398 |
| 6,357,504 B1 | * 3/2002 | Patel et al. | ........ 156/499 |
| 6,383,594 B2 | 5/2002 | Weinstein et al. | |
| 6,399,694 B1 | 6/2002 | McGrath et al. | |
| 6,484,463 B1 | 11/2002 | Fay | |
| 6,670,011 B2 | * 12/2003 | Weinstein et al. | ........ 428/43 |

* cited by examiner

Primary Examiner—Linda Gray
(74) Attorney, Agent, or Firm—Barnes & Thornburg LLP (57) ABSTRACT

A frangible fiberglass insulation batt includes a pair of fiberglass strips arranged to lie in side-by-side relation to one another and a frangible polymerized binder bridge spanning a gap between the fiberglass strips and retaining the fiberglass strips in side-by-side relation. To produce such a batt, a stream of uncured fiberglass insulation is cut along its length to form two side-by-side fiberglass strips and then passed through a curing oven to cause heat generated in the oven to polymerize (cure) binder associated with the strips in the gap to form the frangible polymerized binder bridge.

25 Claims, 4 Drawing Sheets

FRANGIBLE FIBERGLASS INSULATION BATTS

BACKGROUND AND SUMMARY

The present disclosure relates to apparatus and methods for producing fiberglass insulation batts, and in particular, batts of fiberglass insulation suitable for use in building construction. More particularly, the present disclosure relates to fiberglass insulation batts that are configured to be converted into separate fiberglass insulation strips of various predetermined widths in the field without the use of cutting tools.

Fiberglass insulation is made of glass fibers held together by a binder. Glass fibers are produced by melting sand or recycled glass products and spinning those materials to produce tiny strands of fiberglass. Glass fibers will not stick together unless they are glued or bound together. A binder is an adhesive material that holds fibers together, allowing them to keep their shape or overall form. Fiberglass insulation is made, for example, by spraying a binder on the glass fibers. After being cured in an oven, the binder holds the fibers together.

A batt is a blanket of fiberglass insulation used to insulate residential and commercial buildings. Some batts include a paper or foil facing material affixed to the fiberglass insulation, and other batts do not include any facing material.

According to the present disclosure, a frangible fiberglass insulation batt includes a pair of fiberglass strips arranged to lie in side-by-side relation to one another and a frangible polymerized binder bridge spanning a gap between the fiberglass strips and retaining the fiberglass strips in side-by-side relation. Although glass fibers and binder are present in normal amounts in the fiberglass strips, an insubstantial amount of glass fibers is present in the binder bridge. Thus, internal bonds of the binder bridge are relatively weak in comparison to internal bonds of the fiberglass strips.

In the field at a construction site, a worker can separate one of the fiberglass strips (included in the frangible fiberglass insulation batt according to the present disclosure) from the other of the strips by pulling one strip laterally away from the other strip using a "peeling away" action owing to relatively weak internal bonds in the frangible polymerized binder bridge. No tools are needed to accomplish such separation of the two fiberglass strips.

A method of producing such a frangible fiberglass insulation batt comprises the steps for, in series, passing a stream of uncured fiberglass insulation through a cutter to form two side-by-side fiberglass strips, passing the two side-by-side strips through a binder applicator, and then passing the two side-by-side strips through a curing oven. The binder applicator applies a binder to one or both of the strips and the strips are mated to establish the frangible polymerized binder bridge between the strips. In the curing oven, heat generated in the oven causes binder associated with opposing longitudinally extending side walls of the strips to polymerize in a gap between the two side-by-side strips to establish the frangible polymerized binder bridge. This binder bridge spans the gap and retains the two fiberglass strips in fixed relation to one another until the frangible polymerized binder bridge is torn along its length by a construction worker in the field.

In an illustrative embodiment, the binder applicator includes a strip separator, a binder dispenser, and a strip joiner. The strip separator intercepts and deflects the moving fiberglass insulation after it exits the cutter to separate the two side-by-side strips along a cut line therebetween to expose opposing side edges of the strips and provide a widened gap between the strips. The binder dispenser is located in or near the widened gap between the strips and configured to dispense a binder on one or both of the opposing side edges of the strips. The strip joiner is configured to manipulate one or more of the strips to mate or otherwise arrange the opposing side edges of the strips so that binder deposited therebetween is polymerized during exposure to heat in the curing oven to bond with the fiberglass strips to establish the frangible polymerized binder bridge spanning the gap between the fiberglass strips.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Apparatus and methods are disclosed herein for producing a fiberglass insulation batt that is formed to include longitudinally extending frangible planes therein to enable construction workers to convert the fiberglass insulation batt into separate fiberglass insulation strips of various predetermined widths in the field without the use of cutting tools. A "batt" is a blanket of thermal insulation usually comprising glass fibers. In this disclosure, two fiberglass insulation strips are separated by a gap and a binder is applied to the gap and polymerized by exposure to heat to establish a frangible binder bridge spanning the gap.

Relatively weak internal bonds are established during manufacture of the fiberglass insulation batt to define the longitudinally extending frangible planes using apparatus and methods described herein. These internal bonds are strong enough to hold the fiberglass insulation batt "together in one piece" during transport from inventory to a construction site and yet are weak enough to allow a construction worker to separate one longitudinally extending strip in the batt from an adjacent longitudinally extending strip in the batt manually and without the use of cutting tools.

Figure 1:
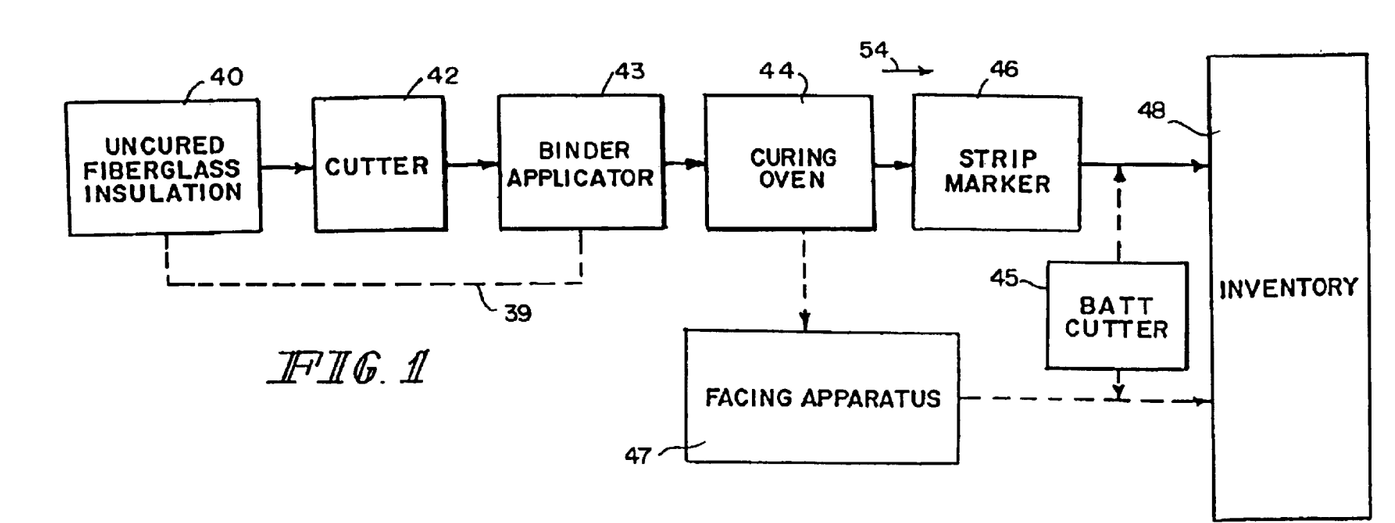
FIG. 1 is a diagrammatic view of methods in accordance with the present disclosure for producing a frangible fiberglass insulation batt (that can be separated by hand into strips having predetermined widths) by cutting an uncured fiberglass batt in a "cutter," passing strips of uncured fiberglass insulation comprising the fiberglass batt through a "binder applicator," and curing that fiberglass batt in a "curing oven" to cause adjacent insulation strips produced by the cutter to bond together to establish a frangible plane therebetween, and then using either a "strip marker" or "facing apparatus" to indicate the location of the frangible planes in the cured fiberglass batt.
Figure 2:
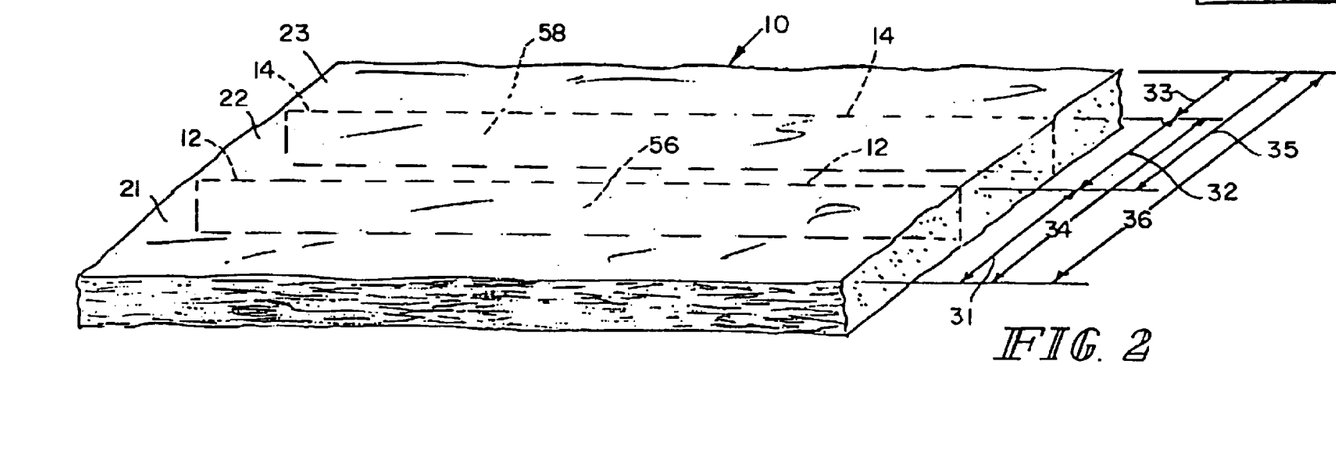
FIG. 2 is a perspective view of a frangible fiberglass insulation batt formed to include two frangible planes extending along the length of the batt so that the batt can be "broken" manually along the two frangible planes to produce three separate insulation strips without the use of cutting tools.
Figures 3, 4, 5, 6:
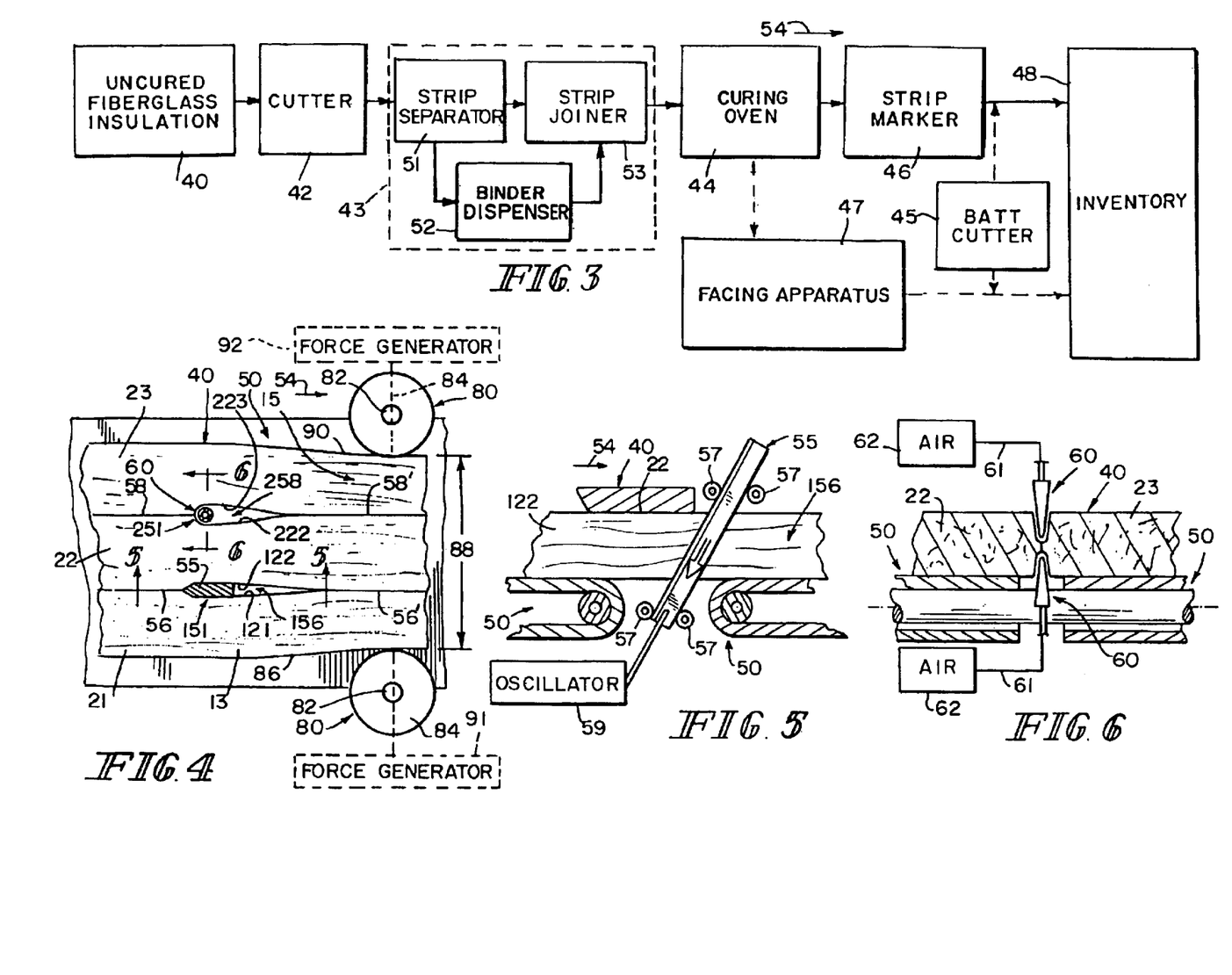
FIG. 3 is a diagrammatic view of other methods in accordance with the present disclosure showing a strip separator, a binder dispenser, and a strip joiner interposed between the cutter and the curing oven.
FIG. 4 is a top plan view of a system for producing a frangible fiberglass insulation batt, which system uses a "knife-shaped" first strip separator to separate a first strip from a second strip along one cut line to establish a widened gap therebetween and a "rod-shaped" second strip separator comprising an "air knife" to separate a second strip from a third strip along another cut line to establish a widened gap therebetween.
FIG. 5 is a sectional view taken along line 5—5 of FIG. 4 showing the knife-shaped first strip separator and oscillator means for moving the first strip separator back and forth to establish the widened gap as the strips move in a downstream direction (to the right) along the conveyor.
FIG. 6 is a sectional view taken along line 6—6 of FIG. 4 showing an air knife coupled to a supply of pressurized air to discharge air into the cut line between the second and third strips to establish the widened gap as the strips move in a downstream direction (to the right) along the conveyor.
Figure 13:
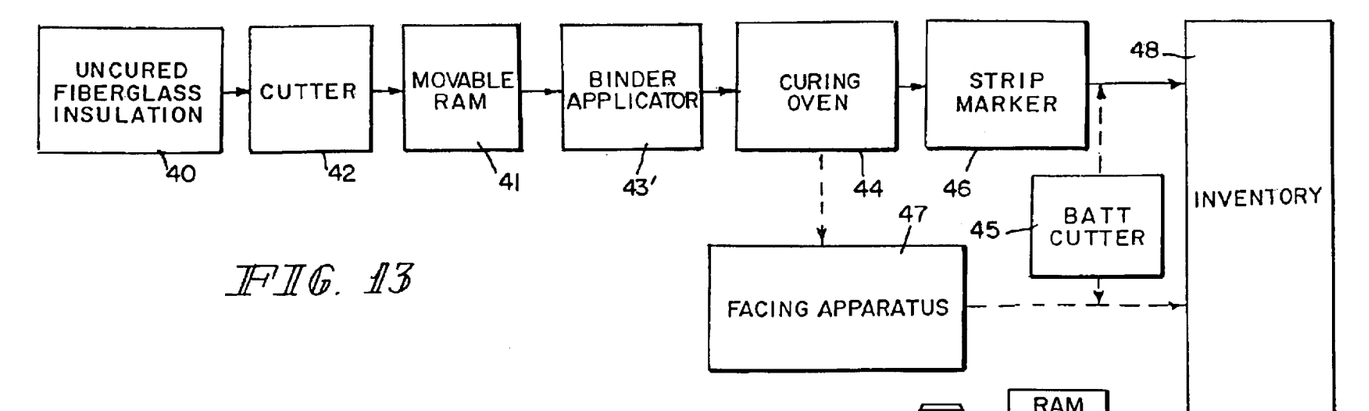
FIG. 13 is a diagrammatic view of further methods in accordance with the present disclosure showing a ram that is movable to establish a widened gap along a cut line between two side-by-side insulation strips.

Various methods are suggested diagrammatically in FIGS. 1, 3, and 13 for producing a frangible fiberglass insulation batt 10 shown, for example, in FIG. 2. Batt 10 is formed using apparatus and methods disclosed herein to include two longitudinally extending frangible planes 12, 14 which are arranged to lie in spaced-apart parallel relation to one another to "partition" batt 10 into three formative longitudinally extending strips 21, 22, and 23.

In the field at a construction site, a worker can separate first strip 21 from second strip 22 along first frangible plane 14 by pulling one strip laterally away from the other strip using a "peeling-away" action owing to relatively weak internal bonds established along first frangible plane 12 between fiberglass material comprising first and second strips 21, 22. Likewise, a worker can separate third strip 23 from second strip 22 along second frangible plane 12 by pulling one of those strips away from the other of those strips in a similar manner owing to relatively weak internal bonds established along second frangible plane 14 between fiberglass material comprising second and third strips 22, 23.

During building construction activities, workers often need to create insulation strips of non-conventional width and the ability to create a variety of strip widths without using cutting tools by use of frangible fiberglass insulation batt 10 would be welcomed by many workers in the construction trade. As suggested in FIG. 2, first strip 21 has a width 31, second strip 22 has a width 32, and third strip 23 has a width 33. When bonded together during manufacture, first and second strips 21, 22 have a combined width 34, second and third strips 22, 23 have a combined width 35, and first, second, and third strips 21, 22, and 23 have a combined width 36. By selecting the location of frangible planes 12, 14 carefully during manufacture, it is possible to create a unified but frangible fiberglass insulation batt that can be separated in the field to produce a wide variety of insulation strip widths without using cutting tools. Because batt 10 is unslitted when delivered to a construction site, batt 10 will function to provide maximum insulation coverage for the full surface area of batt 10. There are no slits in batt 10 which could provide internal channels for conducting cold air along a path partly through the thickness of the insulation batt.

Uncured fiberglass insulation comprises glass fibers coated with a binder. The binder "sets" when exposed to high temperature in a curing oven to bind the glass fibers together. Using the apparatus and method of the present disclosure, separated side-by-side strips of uncured fiberglass insulation are passed through a curing oven to cause binder associated with and applied to the strips to polymerize across a small gap between the side-by-side strips to establish a "bridge" of polymerized binder (containing only an insubstantial amount of glass fibers) spanning that small gap and coupling the side-by-side strips together. Because the polymerized binder bridge contains only an insubstantial amount of glass fibers, it is readily or easily broken (i.e., frangible) in response to manual "tearing" or "peeling" forces applied by a construction worker in the field so that the worker can separate one strip from its side-by-side companion strip manually without the use of cutting tools.

In the embodiment illustrated in FIG. 1, cutter 42, binder applicator 43, curing oven 44, and strip marker 46 are arranged along a conveyor (not shown) to intercept a stream of fiberglass insulation 40 moved by the conveyor in direction 54. Cutter 42, binder applicator 43, and curing oven 44 cooperate to convert uncured fiberglass insulation 40 into a frangible fiberglass insulation batt 10.

Cutter 42 cuts all the way through uncured fiberglass insulation 40 as the insulation 40 passes through cutter 42 to provide first, second, and third strips 21, 22, and 23 separated by longitudinally extending gaps 56 and 58. However, in another embodiment, a strip press (not shown) is arranged along the conveyor to lie upstream of cutter 42. The strip press is configured to compress uncured fiberglass insulation 40 to a compacted thickness to facilitate cutting of insulation 40 in cutter 42.

Binder applicator 43 is configured to apply a binder to portions of first, second, and third strips 21, 22, 23 along longitudinally extending gaps 56 and 58. In preferred embodiments, binder applied by binder applicator 43 is located in and/or along gaps 56 and 58. It is within the scope of this disclosure to arrange two pieces of insulation in side-by-side relation to one another to form a gap therebetween (as suggested diagrammatically by phantom line 39) and then use binder applicator 43 to apply a binder in and/or along that gap.

These strips 21, 22, and 23 are then passed through curing oven 44 and heat generated in oven 44 polymerizes binder coating glass fibers in strips 21, 22, and 23 and binder located in and/or along gaps 56 and 58 to produce cured fiberglass insulation comprising (1) cured fiberglass strips 21, 22, and 23 separated by gaps 56, 58 and (2) a longitudinally extending frangible polymerized binder bridge spanning each of gaps 56 and 58. In curing oven 44 binder associated with longitudinally extending side walls of adjacent strips polymerizes to establish a frangible bridge spanning the gap between the opposing side walls of the adjacent strips during exposure to fiberglass curing heat (at a temperature of about 350° F. to 600° F.) to produce a batt 10 that appears to be monolithic and yet comprises at least one pair of adjacent insulation strips bonded to one another by relatively weak internal bonds along a frangible plane located therebetween. To the naked eye, these gaps 56, 58 seem to "disappear" owing to the development of the polymerized binder bridges in gaps 56, 58 to cause an observer to perceive that cured fiberglass insulation 60 is a monolithic material. In fact, the polymerized binder bridge in longitudinally extending gap 56 defines a first frangible plane 12 and the polymerized binder bridge in longitudinally extending gap 58 defines a second frangible plane 14.

The cured fiberglass insulation is then passed through strip marker 46 wherein an indicator line 112 is applied to an exterior portion of the cured fiberglass insulation to mark the location of first frangible plane 12 and an indicator line 114 is applied to the exterior portion of the cured fiberglass insulation to mark the location of second frangible plane 14. Ink, tape, or any other suitable visible marking agent can be used to establish indicator lines 112, 114. It is within the scope of this disclosure to introduce a colorant into gaps 56, 58 during the binder-applying step to create a visible indicator line extending along each of gaps 56, 58 and having a color different than the color of one or more of strips 121, 122, and 123.

Using another method illustrated diagrammatically in FIG. 1, a facing apparatus 47 is used to apply a facing material (pre-marked with indicator lines) to one surface of the now-cured fiberglass insulation to align the indicator lines with the frangible planes formed in the cured fiberglass insulation.

As suggested in FIG. 1, a batt cutter 45 is provided downstream of strip marker 46 or facing apparatus 47. Batt cutter 45 is configured to periodically cut the strips 21, 22, 23 and frangible "bridges" 12, 14 laterally to provide a series of separate elongated frangible fiberglass insulation batts (not shown) for delivery to inventory 48.

In an embodiment illustrated diagrammatically in FIG. 3, binder applicator 43 comprises a strip separator 51, a binder dispenser 52, and a strip joiner 53. Strip separator 51 is located and configured to widen the gap formed between two fiberglass insulation strips by cutter 42. Binder dispenser 52 is located and configured to dispense binder into the widened gap between the two fiberglass insulation strips. Strip joiner 53 is configured to move one or both of the two fiberglass insulation strips to narrow the gap therebetween before the fiberglass insulation strips are cured in curing oven 44. In curing oven 44, the two side-by-side fiberglass insulation strips (comprising glass fibers and any binder associated with the glass fibers) and any binder in the gap between the strips is heated to polymerize said binder to establish a frangible binder bridge spanning the gap to produce a fiberglass insulation batt.

Various embodiments of strip separators 51 are shown in FIGS. 4–6. As shown in FIG. 4, a first strip separator 151 comprises a knife blade 55 or other wedge-shaped member arranged to intercept and deflect insulation 40 in strips 21 and 22 exiting cutter 42 to separate strips 21 and 22 along a cut line therebetween to expose longitudinally extending side edges 21, 122 of strips 21, 22 and provide a widened gap 156 between strips 21, 22. Portions of strips 21 and 22 are moved laterally away from one another or otherwise apart by blade 55 to produce widened gap 156 as insulation 40 moves in a downstream direction 54 along a conveyor 50.

Blade 55 is supported on suitable supports 57 for oscillatory movement and an oscillator 59 provides means for moving blade 55 back and forth to produce widened gap 156 as suggested in FIG. 5. Blade 55 is constantly in contact with fiberglass insulation 40 but is long enough to be oscillated through it completely. Blade 55 could be wiped clean as it is pulled out of insulation 40. Blade 55 could be mounted to lie at an angle to insulation 40 (as shown) or perpendicular to insulation 40. In one embodiment, oscillating knife blade 55 is used to widen a gap produced by a "water-jet" cutter. This blade 55 functions to widen the gap formed by the water-jet cutter to improve access of a downstream binder dispenser 52.

As also shown in FIG. 4, a second strip separator 251 comprises an air knife or nozzle 60 coupled to a supply of pressurized air (or other suitable fluid or gas) 62 by conduit 61 and arranged to discharge air into gap 58 between fiberglass insulation strips 22, 23 to expose longitudinally extending side edges 222, 223 of strips 22, 23 and to establish a widened gap 258 therebetween as strips 22, 23 move on conveyor 50 in downstream direction 54. A binder dispenser 52 is then used to dispense binder into widened gap 258 to contact one or both of longitudinally extending side edges 222, 223 of strips 22, 23.

Figure 7:
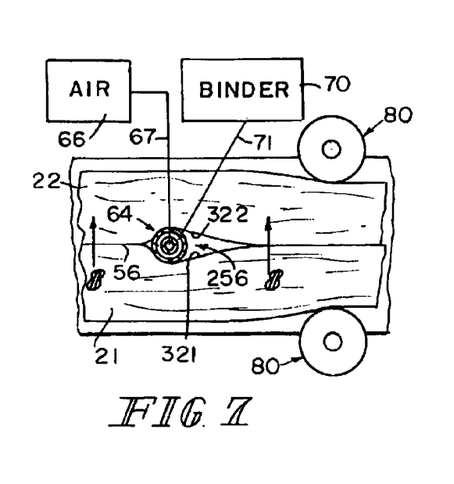
FIG. 7 is a top plan view of a first embodiment of a binder applicator.
Figure 8:
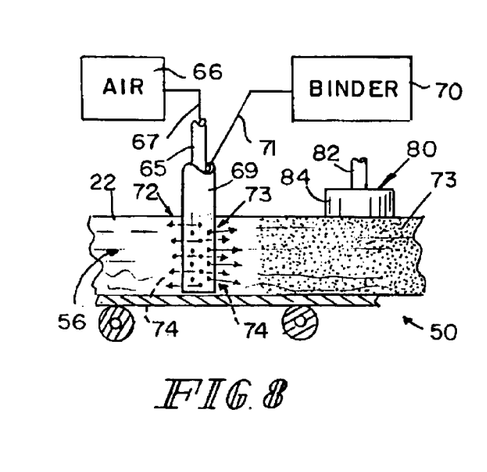
FIG. 8 is a sectional view taken along line 8—8 of FIG. 7.

As suggested in FIGS. 7 and 8, a conduit 64 is configured to function as a strip separator and as a binder applicator. Conduit 64 includes a first tube 65 for receiving pressurized air (or other suitable fluid or gas) from a supply of pressurized air 66 via a delivery line 67 and a second tube 69 for receiving pressurized binder from a supply of binder 70 via a delivery line 71. Means is provided in a lower portion of tubes 65, 69 for discharging pressurized air 72 toward portions of fiberglass insulation strips 21, 22 and/or into gap 56 to move those strip portions away from one another to establish a widened gap 256 between strips 21, 22. Means is also provided in a lower portion of tube 69 for spraying or otherwise discharging binder 73 into widened gap 256 and onto one or both of opposing side edges 321, 322 of strips 21, 22 defining widened gap 256 therebetween. Binder 73 can be discharged continuously, intermittently, or periodically. It is also within the scope of this disclosure to mix pressurized air in tube 65 with a binder solution conducted in tube 69 to provide an air/binder mixture (e.g., 74) and discharging the pressurized mixture into gap 56 and widened gap 256 to provide means for simultaneously widening gap 56 and dispensing a binder onto opposing side edges 321, 322 of strips 21, 22.

Figure 9:
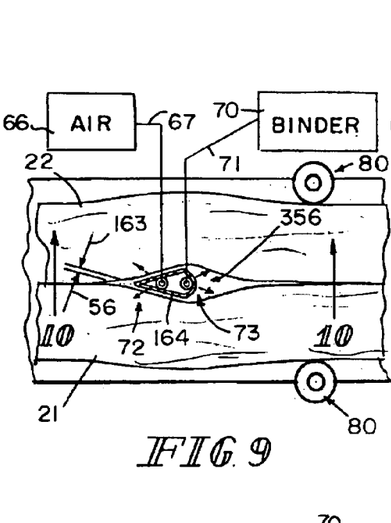
FIG. 9 is a top plan view of a second embodiment of a binder applicator.
Figure 10:
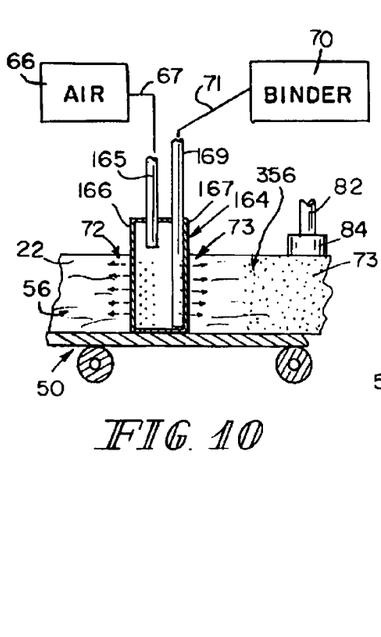
FIG. 10 is a sectional view taken along line 10—10 of FIG. 9.

In another embodiment suggested in FIGS. 9 and 10, a shoe-shaped conduit 164 is sized to contain an air tube 165 and a binder tube 169. Pressurized air 72 is discharged into gap 56 and/or onto opposing side edges of strips 21 and 22 through air apertures formed in an upstream side 166 of conduit 164. As suggested in FIG. 9, pressurized air 72 creates an "air cushion" between, e.g., conductor 164 and strip 21 defined, e.g., by dimension 163 so that neither of strips 21, 22 contact conduit 164. Binder 73 is discharged into gap 356 and/or onto one or both of opposing side edges of strips 21 and 22 through binder apertures formed in a downstream side 167 of conduit 164. Binder 73 can be discharged continuously, intermittently, or periodically.

Figure 11:
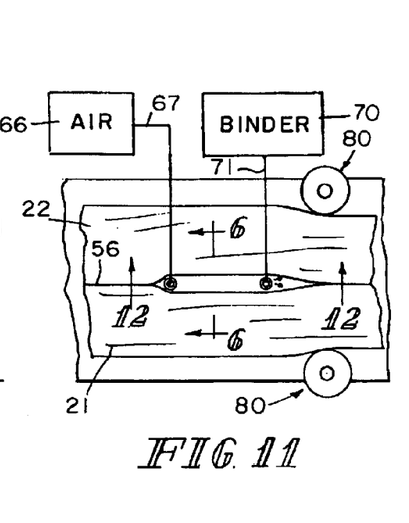
FIG. 11 is a top plan view of a third embodiment of a binder applicator.
Figure 12:
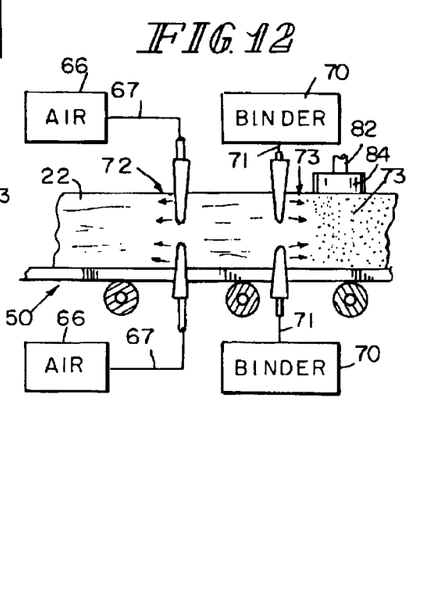
FIG. 12 is a sectional view taken along line 12—12 of FIG. 11.

In another embodiment, suggested in FIGS. 11 and 12, air tube 165 and binder tube 169 are not contained inside a conduit (such as conduit 164 in FIGS. 9 and 10). Air tube 165 is located in an upstream spaced-apart relation to binder tube 169. Binder 73 can be discharged continuously, intermittently, or periodically.

Strip joiner 53 is configured to manipulate one or more of strips 21, 22, 23 to mate (i.e., join or fit together) or otherwise arrange the opposing side edges of pairs of adjacent strips. Binder deposited between adjacent pairs of strips is polymerized during exposure to heat in curing oven 44 to bond with the fiberglass insulation strips to establish a frangible polymerized binder bride spanning each gap between adjacent pairs of fiberglass insulation strips.

In one embodiment, as suggested in FIG. 4, strip joiner 53 comprises two barriers 80 that are spaced apart from one another to define a channel 15 therebetween as suggested in FIG. 4. A downstream portion 13 of fiberglass insulation 40 (having a width that is wider than the width of channel 15) is transported on conveyor 50 through channel 15 to compress blanket 11 to cause (1) first and second strips 21, 22 to move toward one another to trap binder introduced into widened gap 156 and (2) second and third strips 22, 23 to move toward one another to trap binder introduced into widened gap 258. Later, during exposure to curing heat, binder extant in gap 56' is polymerized to establish a frangible binder bridge between strips 21, 22 and binder extant in gap 58' is polymerized to establish a frangible binder bridge between strips 22, 23.

In one embodiment, each barrier 80 includes an upright axle 82 and an edge roller 84 mounted for rotation on upright axle 82 to engage an exterior edge 86 or 90 of fiberglass insulation 40 as it moves along conveyor 50. Illustratively, barriers 80 are anchored in a fixed position relative to one another and to moving insulation 40 to cause the distance 88 between barriers 80 to be fixed and less than the width of the portion of insulation 40 entering channel 15 defined by barriers 80.

In another embodiment, strip joiner 53 is provided by force generators 91, 92 as suggested diagrammatically in FIG. 4. It is within the scope of this disclosure to use a first force generator 91 to discharge a first stream (continuous or pulsed flow) of pressurized gas (e.g., air) to impact first exterior edge 86 of fiberglass insulation 40 and to use a second force generator 92 to discharge a second stream of pressurized gas to impact a second exterior edge 90 of fiberglass insulation 40. It is within the scope of this disclosure to use one force generator to produce both of the first and second streams of pressurized gas. The forces applied to first exterior edge 86 and to second exterior edge 90 cooperate to compress insulation laterally to mate strips 21, 22, and 23 to trap the binder deposited therebetween.

Figure 14:
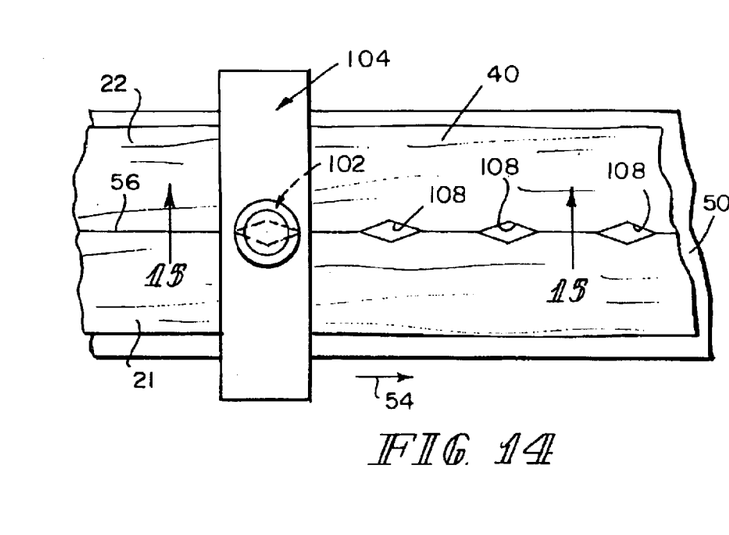
FIG. 14 is a top plan view showing a movable ram mounted to lie above a cut line between two side-by-side insulation strips moving along a conveyor and three binder-receiver pockets established along the cut line by the movable ram.
Figure 15:
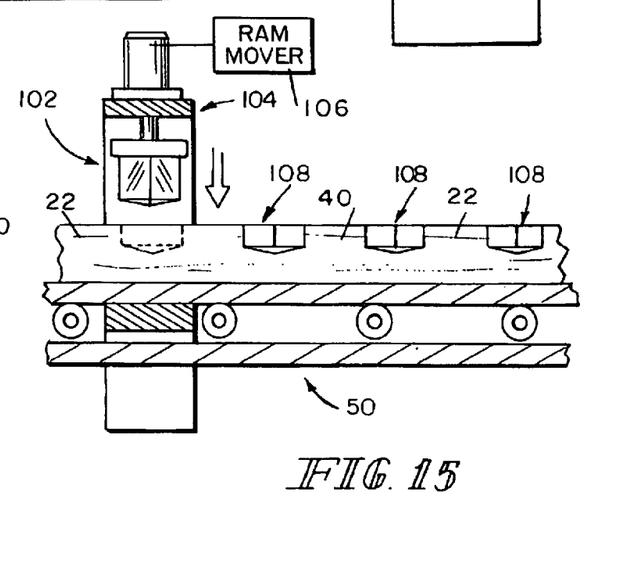
FIG. 15 is a sectional view taken along line 15—15 of FIG. 14.

In an embodiment illustrated diagrammatically in FIG. 13, a movable ram 41 is employed to create a widened gap 456 between two fiberglass insulation strips. Movable ram 41 is interposed between cutter 42 and binder applicator 43' as suggested in FIG. 13. As suggested in FIGS. 14 and 15, a movable ram 102 is mounted on a support 104 overlying a conveyor 50 to lie above a gap (gap/cut line 56) between two side-by-side fiberglass insulation strips 21, 22 moving along conveyor 50. A ram mover 106 is configured to move ram 102 (up and down) relative to support 104 to create a series of binder-receiver pockets 108 along gap 56 as insulation 40 moves in downstream direction 54 along conveyor 50. Binder applicator 43' includes a binder dispenser and, for example, a strip joiner.

It is within the scope of this disclosure to move two separate fiberglass insulation strips to lie in side-by-side relation to one another to establish a gap therebetween (without necessarily cutting one piece of fiberglass insulation to produce side-by-side insulation strips). It is also within the scope of this disclosure to form a slit or other longitudinally extending channel between two fiberglass insulation strips (without cutting "all of the way through" the insulation) and dispense a binder into that channel and then heat the binder to establish a frangible binder bridge spanning that channel and overlying a "fiberglass bridge" interconnecting the side-by-side insulation strips separated by the channel.

What is claimed is:

1. A method of producing a frangible fiberglass insulation batt, the method comprising
passing a stream of uncured fiberglass insulation through a cutter to cut the uncured fiberglass insulation to form side-by-side separate strips separated by a gap,
applying a binder to portions of at least one of the side-by-side separate strips along the gap, and then
passing the two side-by-side separate strips through a curing oven to expose the strips and the binder applied to portions of at least one of the side-by-side separate strips along the gap to a curing heat to polymerize the binder to establish a frangible binder bridge spanning the gap to produce a frangible cured fiberglass insulation batt.

2. The method of claim 1, wherein the act of applying a binder to portions of at least one of the side-by-side separate strips along the gap comprises
intercepting and deflecting the stream of fiberglass insulation exiting the cutter to separate the two side-by-side strips along a cut line therebetween to expose side edges of the strips and provide a widened gap between the strips.

3. The method of claim 2, wherein the act of applying a binder to portions of at least one of the side-by-side separate strips further comprises dispensing a binder onto one or both of the opposing side edges of the strips.

4. The method of claim 3, wherein the act of applying a binder to portions of at least one of the side-by-side separate strips further comprises manipulating at least one of the strips to arrange the opposing side edges of the strips to cause binder dispensed on one or both of the opposing side edges to polymerize during exposure to the curing heat to bond with the strips to establish the frangible polymerized binder bridge.

5. The method of claim 3, wherein the act of applying a binder to portions of at least one of the side-by-side separate strips further comprises mating the opposing side edges of the strips to cause any binder deposited therebetween to polymerize during exposure to the curing heat to establish the frangible polymerized binder bridge.

6. The method of claim 2, wherein the act of applying a binder to portions of at least one of the side-by-side separate strips further comprises dispensing a binder into the widened gap between the strips.

7. The method of claim 6, wherein the act of applying a binder to portions of at least one of the side-by-side separate strips further comprises mating the side-by-side separate strips to cause any binder deposited therebetween to polymerize during exposure to the curing heat to establish the frangible polymerized binder bridge.

8. The method of claim 1, wherein the act of applying a binder to portions of at least one of the side-by-side separate strips along the gap comprises the acts of exposing opposing side edges of the strips lying along the gap and dispensing a binder on one or both of the opposing side edges of the strips.

9. The method of claim 8, wherein the act of applying a binder to portions of at least one of the side-by-side separate strips along the gap further comprises manipulating at least one of the strips to arrange the opposing side edges of the strips to cause binder dispensed on one or both of the opposing side edges to polymerize during exposure to the curing heat to bond with the strips to establish the frangible polymerized binder bridge.

10. The method of claim 8, wherein the act of applying a binder to portions of at least one of the side-by-side separate strips along the gap further comprises mating the opposing side edges of the strips to cause any binder deposited therebetween to polymerize during exposure to the curing heat to establish the frangible polymerized binder bridge.

11. The method of claim 1, wherein the act of applying a binder to portions of at least one of the side-by-side separate strips along the gap further comprises the acts of locating a dispenser in the gap and using the dispenser to dispense a binder into the gap between the strips.

12. The method of claim 11, wherein the act of applying a binder to portions of at least one of the side-by-side separate strips along the gap further comprises mating the side-by-side separate strips to cause any binder deposited therebetween to polymerize during exposure to the curing heat to establish the frangible polymerized binder bridge.

13. A method of producing a frangible fiberglass insulation batt, the method comprising
    passing uncured fiberglass insulation through a cutter to cut the uncured fiberglass insulation to form side-by-side separate strips separated by a gap,
    using a strip separator to move portions of the side-by-side separate strips away from one another to provide a widened gap between the strips,
    dispensing a binder into the widened gap between the strips, and
    passing the two side-by-side separate strips through a curing oven to expose the strips and binder dispensed into the widened gap between the strips to a curing heat to polymerize the binder to establish a frangible binder bridge spanning the gap to produce a frangible cured fiberglass insulated batt.

14. A method of producing a frangible fiberglass insulation batt, the method comprising
    passing fiberglass insulation through a cutter to cut the fiberglass insulation to form side-by-side separate strips separated by a gap,
    using a strip separator to move portions of the side-by-side separate strips away from one another to provide a widened gap between the strips,
    dispensing a binder into the widened gap between the strips, and
    passing the two side-by-side separate strips through a curing oven to expose the strips and binder dispensed into the widened gap between the strips to a curing heat to polymerize the binder to establish a frangible binder bridge spanning the gap to produce a frangible fiberglass insulated batt, wherein the strip separator comprises a knife blade mounted for oscillatory movement in the gap and an oscillator coupled to the knife blade and configured to oscillate the knife blade in the gap to provide the widened gap between the strips.

15. A method of producing a frangible fiberglass insulation batt, the method comprising
    passing fiberglass insulation through a cutter to cut the fiberglass insulation to form side-by-side separate strips separated by a gap,
    using a strip separator to move portions of the side-by-side spearate strips away from one another to provide a widened gap between the strips,
    dispensing a binder into the widened gap between the strips, and
    passing the two side-by-side separate strips through a curing oven to expose the strips and binder dispensed into the widened gap between the strips to a curing heat to polymerize the binder to establish a frangible binder bridge spanning the gap to produce a frangible fiberglass insulated batt, wherein the strip separator comprises an air knife providing means for discharging pressurized air into the gap to provide the widened gap between the strips.

16. A method of producing a frangible fiberglass insulation batt, the method comprising
    passing fiberglass insulation through a cutter to cut the fiberglass insulation to form side-by-side separate strips separated by a gap,
    using a strip separator to move portions of the side-by-side separate strips away from one another to provide a widened gap between the strips,
    dispensing a binder into the widened gap between the strips, and
    passing the two side-by-side separate strips through a curing oven to expose the strips and binder dispensed into the widened gap between the strips to a curing heat to polymerize the binder to establish a frangible binder bridge spanning the gap to produce a frangible fiberglass insulated batt, wherein the strip separator comprises a conduit arranged to intercept the side-by-side separate strips along the gap and formed to include means for discharging pressurized air into the gap to provide the widened gap between the strips.

17. The method of claim 16, wherein the conduit further includes means for dispensing binder into the widened gap to accomplish the act of dispensing a binder into the widened gap between the strips.

18. A method of producing a frangible fiberglass insulation batt, the method comprising
    passing fiberglass insulation through a cutter to cut the fiberglass insulation to form side-by-side separate strips separated by a gap,
    using a strip separator to move portions of the side-by-side separate strips away from one another to provide a widened gap between the strips,
    dispensing a binder into the widened gap between the strips, and
    passing the two side-by-side separate strips through a curing oven to expose the strips and binder dispensed into the widened gap between the strips to a curing heat to polymerize the binder to establish a frangible binder bridge spanning the gap to produce a frangible fiberglass insulated batt, wherein the strip separator comprises a ram and means for moving the ram to engage the side-by-side separate strips as the strips move relative to the ram to form a series of binder-receiver pockets in the strips along the gap, which binder-receiver pockets cooperate to form the widened gap.

19. The method of claim 13, wherein the act of using a strip separator to move portions of the side-by-side separate strips away from one another to provide a widened gap between the strips comprises the act of applying a force to one or both of a first side edge of a first of the strips an a second side edge of a second of the strips, the first and second side edges lying in opposed relation to one another to define the gap therebetween, to provide the widened gap between the strips.

20. The method of claim 19, wherein the act of dispensing a binder into the widened gap between the strips comprises discharging a binder onto one or both of the first and second side edges of the strips.

21. The method of claim 20, wherein the act of dispensing a binder into the widened gap between the strips further comprises manipulating at least one of the strips to arrange the first and second side edges to cause binder dispensed on one or both of the first and second side edges to polymerize during exposure to curing heat to bond with the strips to establish the frangible polymerized binder bride.

22. The method of claim 20, wherein the act of dispensing a binder into the widened gap between the strips further comprises mating the first and second side edges to cause only binder deposited therebetween to polymerize during exposure to curing heat to establish the frangible polymerized binder bridge.

23. A method of producing a frangible fiberglass insulation batt, the method comprising providing two strips of uncured fiberglass insulation separated by a gap, dispensing a binder into the gap to contact the two strips, and exposing the two strips and the binder in the gap therebetween to a curing heat to polymerize the binder in the gap to establish a frangible binder bridge spanning the gap to produce a frangible cured fiberglass insulation batt.

24. A method of producing a frangible fiberglass insulation batt, the method comprising cutting uncured fiberglass insulation to form side-by-side strips separated by a gap, separating the side-by-side strips to widen the gap therebetween, dispensing a binder into the gap to contact opposing side edges of the strips defining the gap therebetween, mating the opposing side edges to retain binder in the gap, and heating the binder in the gap to establish a frangible binder bridge spanning the gap to produce a frangible cured fiberglass insulation batt.

25. A method of producing a frangible fiberglass insulation batt, the method comprising cutting uncured fiberglass insulation to form side-by-side first and second strips separated by a first gap and a third strip separated from the second strip by a second gap, despensing a binder into the first gap to contact opposing side edges of the first and second strips defining the first gap therebetween, dispensing a binder into the second gap to contact opposing side edges of the second and third strips defining the second gap therebetween, mating the opposing side edges of the first and second strips to retain binder in the first gap and the opposite side edges of the second and third strips to retain binder in the second gap, and heating the binder in the first and second gaps to establish a first binder bridge spanning the first gap and a second binder bridge spanning the second gap to produce a frangible cured fiberglass insulation batt.

\* \* \* \* \*